(12) United States Patent
Thibault et al.

(10) Patent No.: US 9,518,530 B2
(45) Date of Patent: Dec. 13, 2016

(54) TRANSIENT-STATE CONTROL METHOD FOR A HYBRID DRIVE SYSTEM FOR VEHICLES

(71) Applicant: IFP Energies nouvelles, Rueil-Malmaison (FR)

(72) Inventors: Laurent Thibault, Courbevoie (FR); Olivier Grondin, Bois-Colombes (FR); Gilles Corde, Igny (FR); Carole Querel, Rueil-Malmaison (FR); Philippe Moulin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 817 days.

(21) Appl. No.: 13/672,748

(22) Filed: Nov. 9, 2012

(65) Prior Publication Data
US 2013/0131956 A1    May 23, 2013

(30) Foreign Application Priority Data
Nov. 17, 2011 (FR) ..................... 11 03497

(51) Int. Cl.
*G06F 19/00* (2011.01)
*F02D 45/00* (2006.01)
(Continued)

(52) U.S. Cl.
CPC .............. *F02D 45/00* (2013.01); *B60W 10/06* (2013.01); *B60W 10/08* (2013.01); *B60W 20/00* (2013.01);
(Continued)

(58) Field of Classification Search
CPC .. B60W 10/08; B60W 20/10; B60W 20/1082; B60W 30/1882; B60W 10/06; B60W 2510/0676; B60W 2710/0644; B60W 2710/0666; F02D 41/1462; F02D 2250/18; F02D 2250/36; Y02T 10/6286; Y02T 10/84; B60Y 2400/432
(Continued)

(56) References Cited

U.S. PATENT DOCUMENTS 6,438,947 B2 * 8/2002 Ludwig et al. ................. 60/285
8,301,356 B2 * 10/2012 Wang et al. ................... 701/102
(Continued)

FOREIGN PATENT DOCUMENTS

FR          2 926 518 A1    7/2009
WO    WO 2006/056702 A1    6/2006

OTHER PUBLICATIONS

Grondin, Olivier, et al: "Energy Management Strategy for Diesel Hybrid Electric Vehicle", Vehicle Power and Propulsion Conference (VPPC), 2011 IEEE, IEEE, Sep. 6, 2011 (Sep. 6, 2011), pp. 1-8, XP031974922, DOi: 10.1109/VPPC.2011.6043132, ISBN: 978-1-61284-248-6.
(Continued)

*Primary Examiner* — Stephen K Cronin
*Assistant Examiner* — David Hamaoui
(74) *Attorney, Agent, or Firm* — Fitch, Even, Tabin & Flannery LLP

(57) ABSTRACT

The invention relates to a method of controlling a hybrid drive system having at least one electric machine and at least one diesel engine. The invention corrects the static torque setpoint $T_{eng,s}^{sp}$ of the diesel engine and is performed in a transient state by constructing a nitrogen oxides (NOx) emission model allowing estimation of the emissions of the diesel engine as a function of torque $T_{eng}$ of the diesel engine; calculating a dynamic NOx emission setpoint $NO_x^{sp}$ from the NOx emission model; from the static torque setpoint $T_{eng,s}^{sp}$ determining a dynamic torque setpoint of the diesel engine $T_{eng}^{sp}$ from NOx emission setpoint $NO_x^{sp}$;
(Continued)

determining a dynamic torque setpoint of the electric machine $T_{mot}^{sp}$ as a function of the static torque setpoint $T_{pwt}^{sp}$ of the drive system and of the dynamic torque setpoint of the diesel engine $T_{eng}^{sp}$ and applying the dynamic torque setpoints to the drive system.

14 Claims, 11 Drawing Sheets

(51) Int. Cl.
    *B60W 10/06*     (2006.01)
    *B60W 10/08*     (2006.01)
    *B60W 20/00*     (2016.01)
    *F02D 41/14*     (2006.01)
    *B60W 30/188*     (2012.01)

(52) U.S. Cl.
CPC ............ *B60W 20/10* (2013.01); *B60W 20/16* (2016.01); *B60W 30/1882* (2013.01); *F02D 41/1462* (2013.01); *F02D 41/1497* (2013.01); *B60W 2510/0676* (2013.01); *B60W 2710/0644* (2013.01); *B60W 2710/0666* (2013.01); *B60Y 2400/432* (2013.01); *F02D 2250/18* (2013.01); *F02D 2250/36* (2013.01); *Y02T 10/54* (2013.01); *Y02T 10/6286* (2013.01); *Y02T 10/84* (2013.01)

(58) Field of Classification Search
USPC ......................................... 701/102; 180/65.28
See application file for complete search history.

(56) References Cited

U.S. PATENT DOCUMENTS

| | | | |
|---|---|---|---|
| 2004/0235614 A1* | 11/2004 | Tajima et al. | 477/3 |
| 2006/0212140 A1* | 9/2006 | Brackney | 700/29 |
| 2006/0270519 A1 | 11/2006 | Kamada et al. | |
| 2008/0010973 A1 | 1/2008 | Gimbres | |
| 2010/0286858 A1* | 11/2010 | Otokawa | 701/22 |
| 2011/0036075 A1* | 2/2011 | Hagiwara | 60/285 |
| 2011/0264353 A1* | 10/2011 | Atkinson et al. | 701/102 |

OTHER PUBLICATIONS

Sciaretta, Antonio, et al: "Optimal Control of Parallel Hybrid Electric Vehicles", IEEE Transactions on Control Systems Technology, vol. 12, No. 3, May 2004, pp. 352-369.

Chasse, A., et al: "Online Optimal Control of a Parallel Hybrid With Costate Adaptation Rule", Proceedings of the IFAC Symposium on Advanced in Automotive Control, Munich, Germany, Jul. 12-14, 2010. 6 pgs.

Lindenkamp, Nils, et al: "Strategies for Reducing $NO_x$ and Particulate Matter Emissions in Diesel Hybrid Electric Vehicles", SAE Paper No. 2009-01-1305, 2009 (10 pgs.).

Predelli, Oliver, et al: "Laying Out Diesel-Engine Control Systems in Passenger-Car Hybrid Drives", Proceedings of the IAV Conference on Hybrid Vehicle and Energy Management, pp. 131-151, Feb. 14-15, 2007.

Schmitt, J.C. et al: "Compression Ignition Engine Model Supporting Powertrain Development, Proceedings of the IFAC Workshop on Engine and Powertrain Control, Simulation and Modelling", Rueil-Malmaison, France, Nov. 30-Dec. 2, 2009. (8 pages).

\* cited by examiner

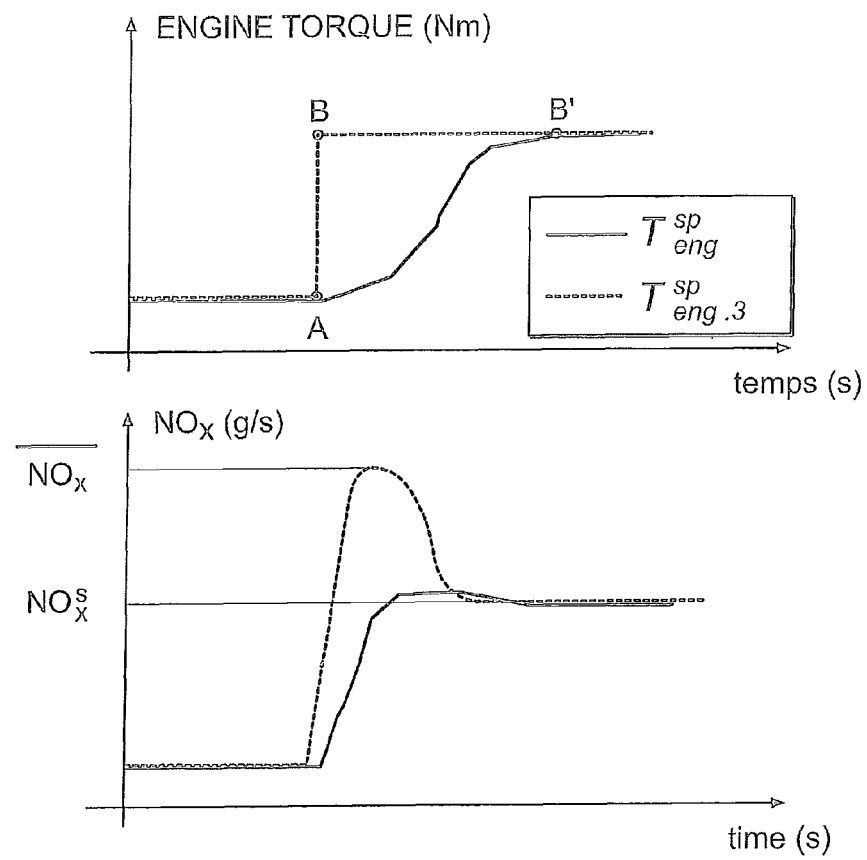
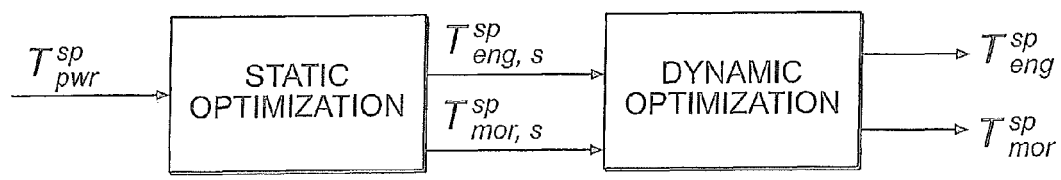
FIG 3
FIG 4

TRANSIENT-STATE CONTROL METHOD FOR A HYBRID DRIVE SYSTEM FOR VEHICLES

CROSS-REFERENCE TO RELATED APPLICATION

Reference is made to French Patent Application Serial No. 11/03.497, filed on Nov. 17, 2011, which application is incorporated herein by reference in its entirety.

BACKGROUND OF THE INVENTION

1. Field of the Invention

The present invention relates to an engine control and more particularly to the transient-state control of a hybrid drive system for vehicles, in order to reduce emissions in a hybrid vehicle comprising at least one electric machine and at least one thermal engine for driving the vehicle.

2. Description of the Prior Art

Accounting for emissions in transient state (generated by the change from one steady-state operating point to another steady-state operating point) from an internal-combustion engine is a very important objective. Indeed, emissions from current engines are highly sensitive to operating deviations. Furthermore, future type approval driving cycles will impose more transient phases. In the case of a hybrid vehicle equipped with a diesel engine, the problem is twofold. First, a compromise has to be reached between the NOx emissions (nitrogen oxides, pollutants emitted by the thermal engine) and the fuel consumption for the steady-state operating point, and second, the transient operating phases of the engine, during which NOx emission peaks are observed, have to be managed.

An example illustrating the transient-state emissions problem is given in FIGS. 1a) to 1d). This example shows the first acceleration of the extra-urban part of an NEDC type driving cycle (New European Driving Cycle, which is a motor vehicle drive cycle intended to mimic in a reproducible manner the conditions encountered on European roads, mainly used to measure vehicle consumption and emissions) for a hybrid drive system equipped with an exhaust gas recirculation system (EGR). During gear ratio change phases, injection cut-off necessarily leads to a decrease in the richness at the exhaust. Burnt gas availability at the intake is therefore limited when injection is restored upon acceleration. In this case, convergence of the burnt gas fraction at the intake to its setpoint is not instantaneous. Its response time depends on the burnt gas transport time in the EGR circuit. During transient phases, the composition of the gases at the intake (and therefore in the cylinder) does not converge to its setpoint and the NOx emissions exceed the static-state emissions. The amplitude of these emission peaks is high in relation to the expected levels under steady conditions and these peaks represent, according to the type of driving cycle, a not insignificant part of the cumulative emissions.

Over a European driving cycle (NEDC), the transient part does not exceed 15% of the total NOx emissions. On the other hand, for an American driving cycle of FTP type (Federal Test Procedure, a drive cycle used in the USA to measure emissions), the transient part represents more than 40% of the total emissions, as can be seen in Table 1. This table shows a comparison between the measured NOx emissions and the quasi-static NOx emissions for two driving cycles (NEDC and FTP) and the transient part of the total emissions for each cycle.

TABLE 1

| | DRIVING CYCLE | | | | | |
|---|---|---|---|---|---|---|
| | NEDC | | | FTP | | |
| | Experiment | Static | Transient part | Experiment | Static | Transient part |
| NOx [mg/km] | 109 | 90 | 15% | 170 | 100 | 42% |
| Consumption [l/100 km] | 4.5 | 4.3 | 3% | 4.7 | 4.4 | 6% |

Accounting for the transient part therefore is an important issue regarding engine control. In this context, thermal engine hybridization represents an option with a high potential. The objective is to limit of thermal engine stress under transient conditions using the electric machine or an alternator starter for compensating for the thermal engine torque setpoint.

Energy supervisors have been developed to control such a hybrid drive system. There are several methods based on optimal control. This type of energy supervisor is presented in the following documents:

A. Sciarretta, M. Back & L. Guzzella, "Optimal Control of Parallel Hybrid Electric Vehicles", IEEE Transactions on Control Systems Technology, vol. 12, no. 3, May 2004.

A. Chasse, A. Sciarretta & J. Chauvin, "Online Optimal Control of a Parallel Hybrid with Costate Adaptation Rule", Proceedings of the IFAC Symposium on Advances in Automotive Control, Munich, Germany, Jul. 12-14, 2010.

O. Grondin, L. Thibault, Ph. Moulin, A. Chasse & A. Sciarretta, "Energy Management Strategy for Diesel Hybrid Electric Vehicle", Proceedings of the 7th IEEE Vehicle Power and Propulsion Conference, Chicago, USA, 6-9 Sep. 2011.

However, although these energy supervisors make it possible to manage the static states of the hybrid drive system, they are not suited for the management of transient states.

The thermal engine is considered to be a purely quasi-static system. This hypothesis is acceptable if the engine torque is considered but it is wrong if the emissions are considered. Thus, the part of the emissions produced during transient operation phases in relation to the total emissions is not insignificant. It is therefore necessary to account for the transition between two steady points selected by the static supervisor.

FIGS. 2a) and 2b) show the impact of the torque gradient on the NOx emissions. In order to manage the transient operation phases of the engine, heuristic methods intended to limit the value of the torque gradient required from the thermal engine, while using the electric machine to provide the missing torque and to meet the wheel setpoint, have been developed. This type of heuristic method is illustrated in the following documents:

N. Lindenkamp, C.-P. Stöber-Schmidt & P. Eilts, "Strategies for Reducing $NO_x$ and Particulate Matter Emissions in Diesel Hybrid Electric Vehicles", SAE Paper no 2009-01-1305, 2009, O. Predelli, F. Bunar, J. Manns, R. Buchwald and A. Sommer, "Laying Out Diesel-Engine Control Systems in passenger-Car Hybrid Drives", Proceedings of the IAV conference on Hybrid Vehicle and Energy Management, pp. 131-151, Feb. 14-15, 2007.

However, this type of empirical strategy does not allow finding the optimum trajectory and adjustment of the gradient slope depends on the engine, its calibration and the drive mode. In fact, the limits of these gradients have to be calibrated for each cycle.

SUMMARY OF THE INVENTION

The invention allows reduction of the transient emissions of a thermal engine in a hybrid drive system by integrating the physical phenomena involved in their production.

The invention is a method of controlling a hybrid drive system for vehicles in which the torque trajectory that minimizes thermal engine emissions is defined. During transient operation phases, the invention modifies the distribution among the torque setpoint of the electric machine and the torque setpoint of the thermal engine. The principle is to limit the dynamics of the torque setpoint of the thermal engine. The electric machine provides torque compensation to meet the wheel request. Therefore, according to the invention, the NOx emissions of the diesel engine and the hybrid drive system are modelled with a computer and this model is used to define the torque setpoints of the components of the hybrid drive system.

The advantage of this method lies in the physical phenomena that governs the production of emissions accounting for in the calculation of the torque trajectory. Using models of the physical phenomena which are involved ensures implementation of the method and simplifies the adjustment thereof since the method requires calibration of a single adjustment parameter. Furthermore, the control method allows reduction of the transient part of the NOx emissions, while keeping the fuel consumption gains linked with hybridization. The method according to the invention is complementary to conventional (static) strategies and provides uncoupling of the static and transient objectives in the management of hybrid vehicles.

The invention relates to a method of controlling a hybrid drive system having at least one electric machine and at least one diesel engine, wherein a static torque setpoint $T_{eng,s}^{sp}$ of the diesel engine is acquired, comprising the following:

constructing a computer-implemented nitrogen oxides (NOx) emission model allowing estimation of the emissions of the diesel engine as a function of torque $T_{eng}$ of the diesel engine;

calculating a dynamic NOx emission setpoint $NO_x^{sp}$ from NOx emission model and from the static torque setpoint $T_{eng,s}^{sp}$ of the diesel engine;

determining a dynamic torque setpoint of the diesel engine $T_{eng,s}^{sp}$ from NOx emission setpoint $NO_x^{sp}$;

determining a dynamic torque setpoint of the electric machine $T_{mot}^{sp}$ as a function of the dynamic torque setpoint of the diesel engine $T_{eng,s}^{sp}$; and applying the dynamic torque setpoints to the drive system.

In an embodiment the nitrogen oxides emission model depends on the diesel engine speed and on the maximum temperature in the engine cylinders.

Advantageously, the diesel engine is equipped with an exhaust gas recirculation system causing burnt gas to flow into an intake manifold, upstream from a cylinder of the diesel engine. The NOx emission model depends on the burnt gas fraction $F_1^{est}$ in the intake manifold of the diesel engine.

Preferably, the NOx emissions are modelled by the formula:

$$NO_x = \alpha_1 \left(\frac{N_e}{\alpha_2}\right)^{\alpha_3} \left(\alpha_4(\hat{T}_{cyl} - \alpha_5)\right)^{\alpha_6(1-\alpha_7 F_1)}$$

with:

$\alpha_1$ to $\alpha_7$ being calibration coefficients of the NOx model,
$N_e$ being diesel engine speed,
$\hat{T}_{cyl}$ being maximum temperature in the engine cylinder,
$F_1$ being burnt gas fraction in the intake manifold if the diesel engine is equipped with an exhaust gas recirculation circuit,
[-] this value is zero otherwise, and
$NO_x$ is the NOx emissions level.

In an embodiment, a NOx emission threshold is defined for the diesel engine. The NOx emission setpoint $NO_x^{sp}$ is calculated as a function of the threshold.

Alternatively, a NOx emission reduction factor ξ can be set with the NOx emission setpoint $NO_x^{sp}$ being calculated as a function of the reduction factor ξ.

Furthermore, determination of the dynamic torque setpoint of the diesel engine can be obtained by inverting the NOx emission model.

Preferably, the static torque setpoint $T_{eng,s}^{sp}$ of the diesel engine is obtained from a drive system torque setpoint $T_{pwt}^{sp}$ by an energy supervisor, notably a quasi-static energy supervisor of the hybrid drive system.

The invention also relates to a computer program product downloadable from a communication network and/or recorded on a computer readable medium and/or controller executable. The computer program product comprises program code instructions for implementing the method according to the invention when the program is executed on a controller.

The invention further relates to a hybrid drive system for a vehicle having at least one electric machine and at least one diesel engine. The drive system is controlled by the control method as defined above. Control of the drive system in transient state can be in cascade with respect to a quasi-static energy supervisor.

The invention also relates to a vehicle, notably a motor vehicle, comprising a hybrid drive system according to the invention.

BRIEF DESCRIPTION OF THE DRAWINGS

Other features and advantages of the method according to the invention will be clear from reading the description hereafter of embodiments given by way of non limitative example, with reference to the accompanying figures wherein:

FIG. 3 illustrates the dynamic setpoint of the thermal engine torque and of the nitrogen oxides emissions;

FIG. 4 is a flowsheet of the dynamic strategy;

FIG. 5a) shows the NOx emission model and FIG. 5b) illustrates a specific embodiment;

DETAILED DESCRIPTION OF THE INVENTION

Figure 1A:
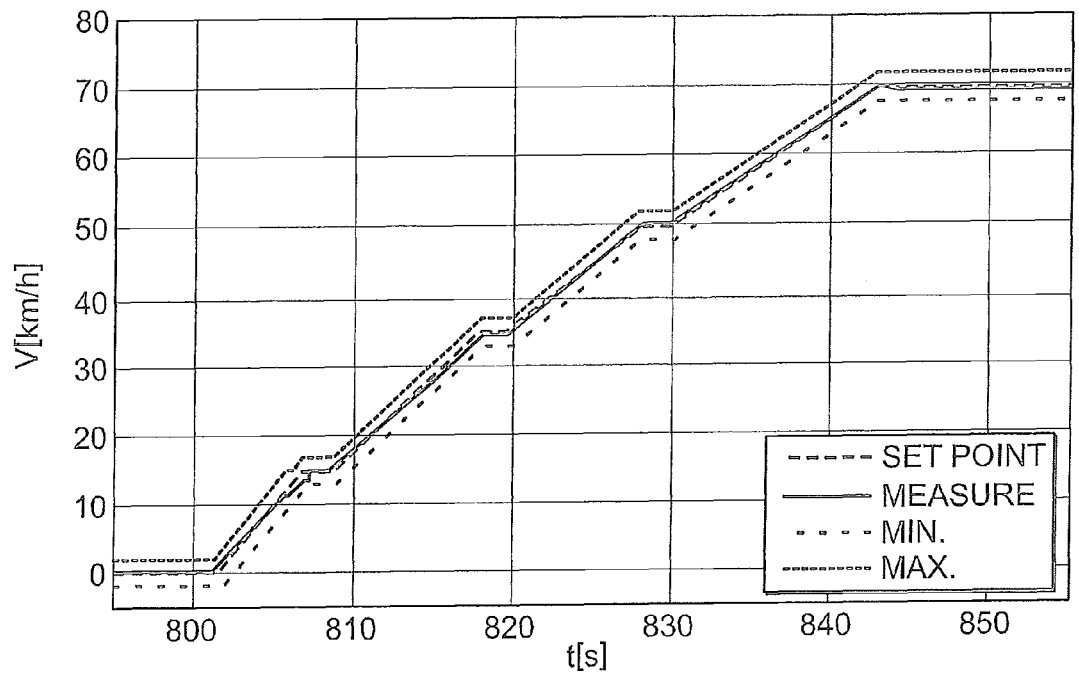
FIGS. 1a) to 1d) illustrate a comparison between the measured NOx emissions and the quasi-static NOx emissions for the first acceleration of the extra-urban part of the NEDC driving cycle, in terms of vehicle speed (1a)), burnt gas fraction in the intake manifold (1b)), engine speed (1c)) and NOx emissions (1d))
Figure 1B:
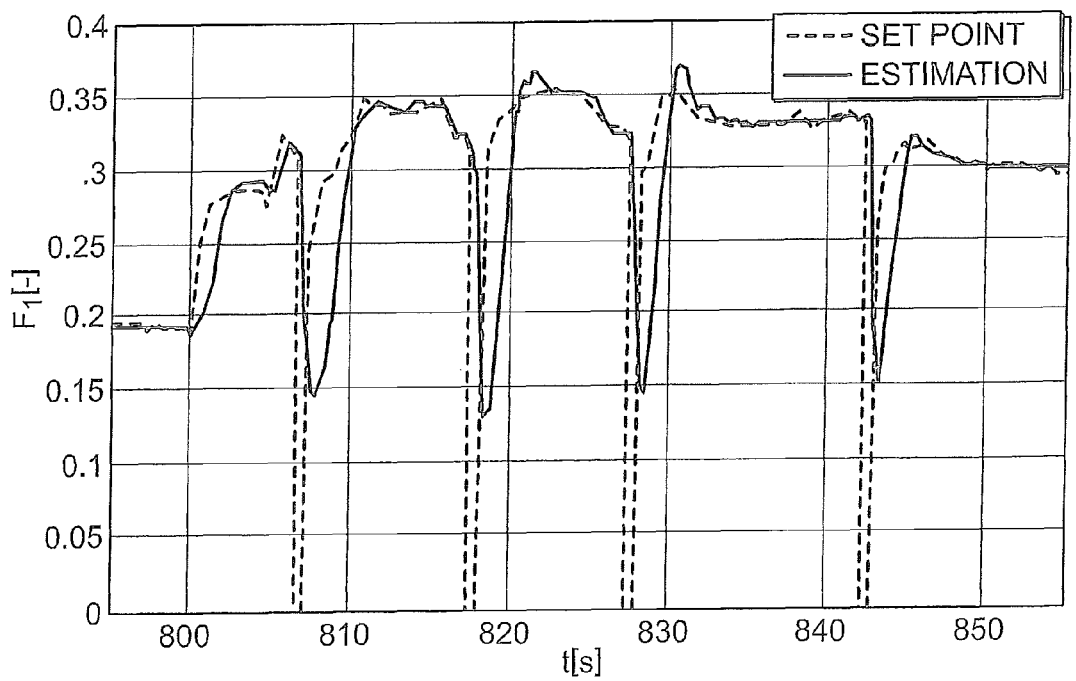
Figure 1C:
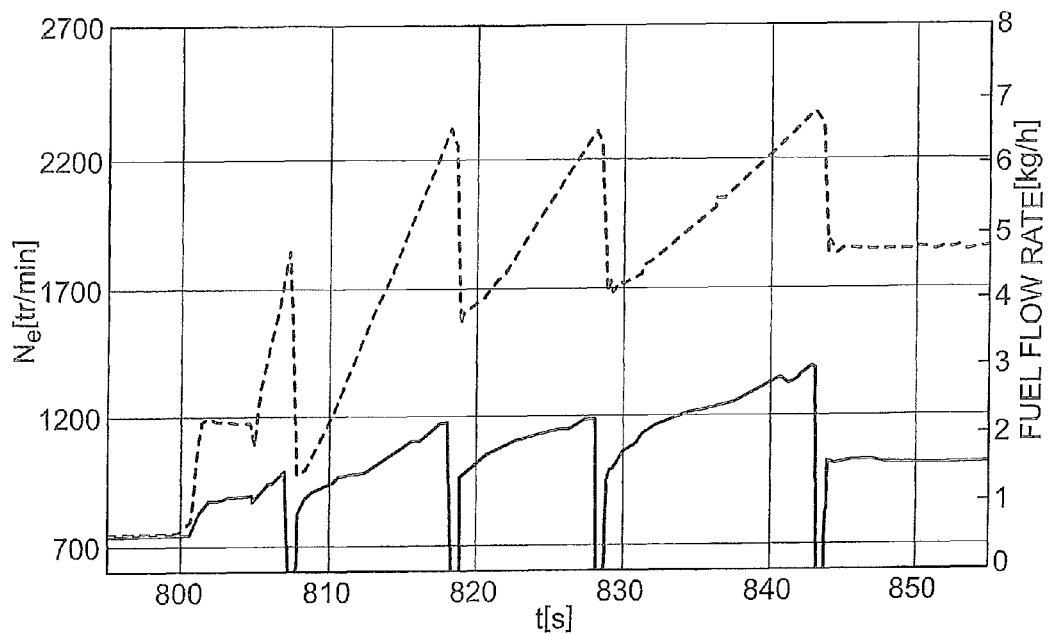
Figure 1D:
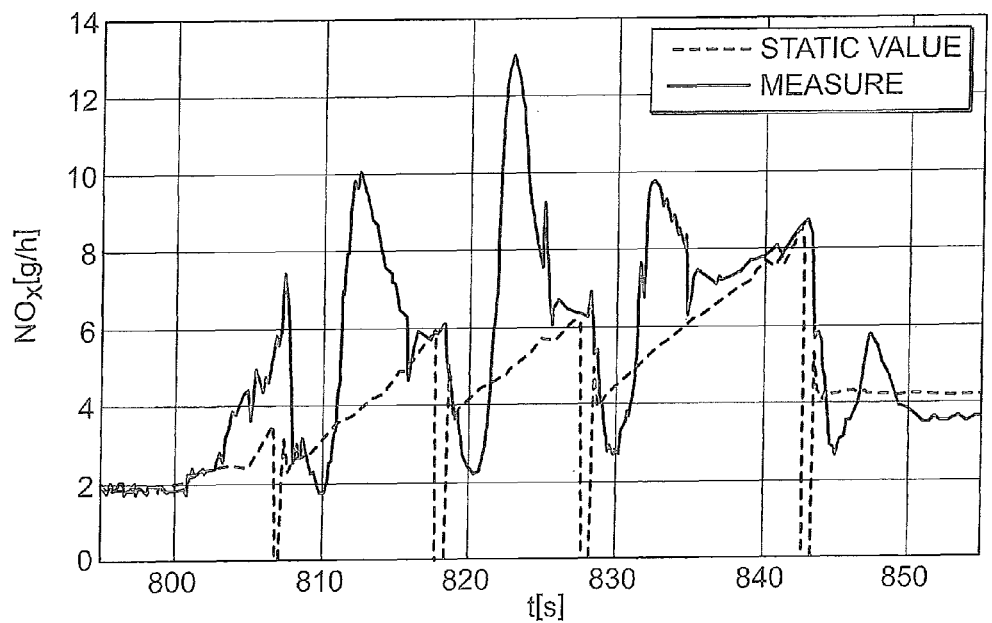
Figure 2A:
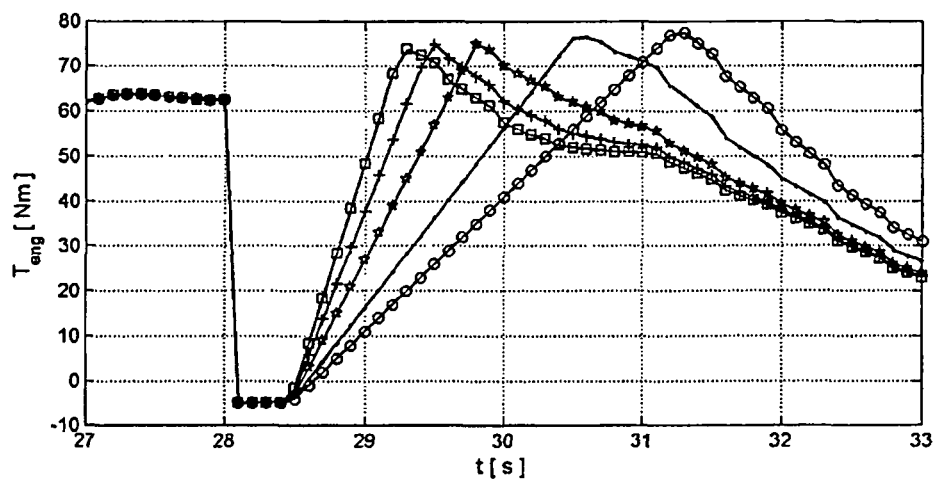
FIGS. 2a) and 2b) illustrate the influence of the engine torque gradient (dT) on the NOx emissions in transient state.
Figure 2B:
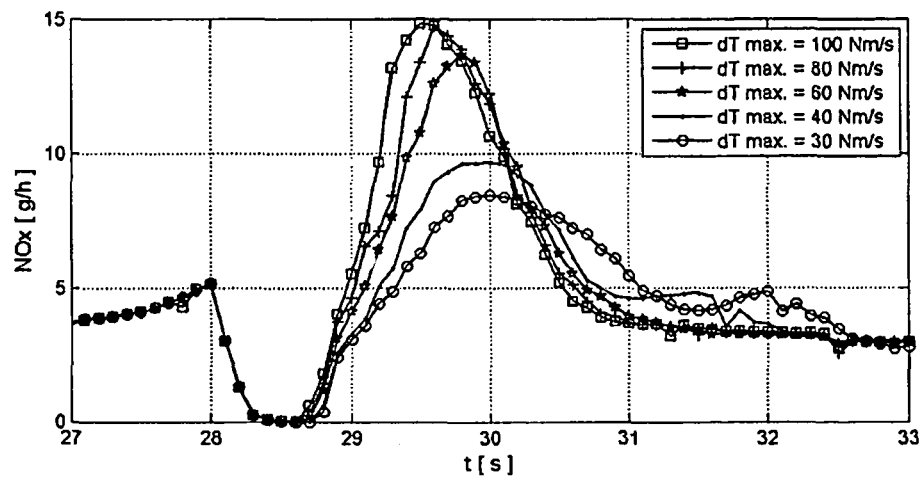

The method according to the invention allows reduction reduces NOx emissions for a hybrid drive system. It allows management of transient phases between two static operating points using a NOx emission model that can predict NOx emissions. This model allows determination of the NOx emissions of the hybrid drive system as a function of the torque of the internal-combustion engine.

According to the invention, the method allows controlling a hybrid drive system of a vehicle, notably a motor vehicle, having at least one electric machine and at least one diesel engine. For the transient states, the following stages are carried out:

acquiring a static torque setpoint $T_{eng,s}^{sp}$ of the thermal engine;

constructing a NOx emission model allowing estimation of the NOx emissions of the diesel engine as a function of the torque $T_{eng}$ of the diesel engine;

calculating a dynamic NOx emission setpoint $NO_x^{sp}$ from the NOx emission model determining the NOx emissions of the diesel engine as a function of the torque setpoint $T_{eng,s}^{sp}$;

deducing a dynamic torque setpoint $T_{eng}^{sp}$ of the diesel engine;

determining a dynamic torque setpoint $T_{mot}^{sp}$ of the electric machine; and applying the dynamic torque setpoints to the drive system.

Nomenclature

The following notations are used in the description hereafter:

ξ is a NOx peak reduction factor [in %];
β is a NOx setpoint initialization threshold [in ppm]:
$α_i$ are calibration parameters of the NOx emissions model [unitless];
$F_1^{sp}$ is the burnt gas mass fraction setpoint in the intake manifold [in %];
$F_1^{est}$ is the estimation of the burnt gas mass fraction in the intake manifold [in %];
$N_e$ is the thermal engine speed [in rpm];
$T_{pwt}^{sp}$ is the static torque setpoint of the drive system [in Nm];
$T_{eng,s}^{sp}$ is the thermal engine static torque setpoint of the thermal engine to be reached as a function of the torque setpoint of the drive system [in Nm];
$T_{mot,s}^{sp}$ is the electric machine static torque setpoint to be reached as a function of the torque setpoint of the drive system [in Nm];
$T_{eng}^{sp}$ is the dynamic thermal engine torque setpoint [in Nm];
$T_{mot}^{sp}$ is the dynamic electric machine torque setpoint [in Nm];
$\hat{T}_{cyl}^{sp}$ is the maximum cylinder temperature for the static torque setpoint [in K];
$\hat{T}_{cyl}^{dyn}$ is the maximum cylinder temperature minimizing NOx emissions [in K];
$\Delta NO_x$ is the NOx peak amplitude with respect to the target steady point [in ppm];

$\epsilon NO_x$ is the NOx emissions error [in ppm];
$\overline{NO_x}$ is the maximum value of the NOx emission peak [in ppm];
$NO_x^s$ is the value of the NOx emissions on a steady point [in ppm];
$NO_x(t)$ is the NOx emissions generated by the nominal torque transient [in ppm]; and
$NO_x^{sp}$ is the NOx emissions setpoint [in ppm].

The principle of the invention is to calculates, during transient operation phases, a thermal engine torque trajectory that minimizes the NOx emissions. The principle of such a method is shown in FIG. 3. It determines, when the torque setpoint ranges between a point A and a point B, if it leads to transient surplus NOx emissions. The curves in thick line show the variation of the thermal engine torque and the variation of the NOx emissions obtained with the method according to the invention and the dotted lines show an instantaneous thermal engine torque variation.

In a preferred embodiment, the drive system is equipped with an exhaust gas recirculation circuit (EGR). In this case, a high engine torque variation generally causes great deviations in the air loop (air intake and exhaust gas recirculation). The thermodynamic conditions in the combustion chamber then deviate from the steady-state conditions and the NOx emissions increase. It is therefore desirable to calculate a new trajectory for the thermal engine torque. The method of determining this new torque setpoint uses a NOx emission model allowing determination of the trajectory that provides minimum emissions between two static torque points (A and B). The transition from point A to point B is no longer instantaneous and it follows a trajectory leading to point B'. During this phase, the thermal engine torque is compensated by the electric machine so that the wheel torque request is met. The method thus compensates the thermal engine torque so as to limit demands leading to NOx emission deviations.

Presentation of an Embodiment

The embodiment described below relates to a diesel engine equipped with a burnt gas recirculation circuit. Furthermore, in this embodiment, an energy supervisor, of static or quasi-static type, allows determination of the torque setpoints of the hybrid drive system in steady state.

Stage 1)—Acquisition of a Torque Setpoint

The goal of the invention is to reduce the transient part of the NOx emissions. What is referred to as transient state is the shift from a static torque setpoint to a second static torque setpoint.

As illustrated in FIG. 4, the static torque setpoints to be applied to the thermal engine $T_{eng}^{sp}$ and to the electric machine $T_{mot,s}^{sp}$ are determined from the torque setpoint of the drive system $T_{pwt}^{sp}$. These static torque setpoints are determined by an energy supervisor, in combination to which the control method according to the invention is implemented. The purpose of this energy supervisor, notably of quasi-static type, is to select the operating points and therefore the torque setpoints of the thermal engine and of the electric machine. The invention is complementary to an ECMS type quasi-static energy supervisor. However, it is totally independent of it and may work downstream from any energy supervisor. The torque setpoint of the drive system $T_{pwt}^{sp}$ corresponds to the wheel torque request notably required by the driver of the vehicle.

Stage 2)—Construction of the NOx Emission Model

The dynamic NOx emission setpoint is calculated from a NOx emission model determining the NOx emissions of the diesel engine. What is referred to as a NOx emission model is a model that can predict the NOx emissions of the diesel engine as a function of the torque of the diesel engine of the hybrid drive system. In order to be precise and representative of the engine, this model has to be calibrated to the diesel engine of the drive system being used and it has to depend on the operating conditions for example of the thermal engine speed $N_e$. Besides, the adjective "dynamic" makes it clear that it is a setpoint that applies to a transient state, that is between two steady-state operating points, evolving as a function of time.

This model is invertible which allows determination thereafter of the dynamic torque setpoint from the dynamic NOx emission setpoint. A semi-empirical NOx emission model can be used.

In this embodiment, the torque trajectory is calculated in cascade with respect to the static calculation as shown in FIG. 4. The static torque setpoint is determined by the static optimization strategy, $T_{eng,s}^{sp}$, is corrected and the dynamic torque setpoint is denoted by $T_{eng}^{sp}$. The relations connecting the torque of the thermal engine, of the electric machine and the torque setpoint of the hybrid drive system remain unchanged:

$$T_{pwt}^{sp} = T_{eng}^{sp} + T_{mot}^{sp} \quad (1)$$

$$T_{pwt,s}^{sp} = T_{eng,s}^{sp} + T_{mot,s}^{sp} \quad (2)$$

The NOx emissions are calculated by the semi-empirical model as follows:

$$NO_x = \phi(N_e, \hat{T}_{cyl}, F_1) \quad (3)$$

It is a correlation that connects the emissions to the engine speed $N_e$, the burnt gas fraction at the intake $F_1$ and the maximum temperature in the cylinder $\hat{T}_{cyl}$. These quantities have been selected because they are involved in the NOx production in the combustion chamber of a diesel engine. This model is described in detail in the following document: J.-C. Schmitt, M. Fremovici, O. Grondin & F. Le Berr, "Compression Ignition Engine Model Supporting Powertrain Development, Proceedings of the IFAC workshop on engine and powertrain control, simulation and modeling", Rueil-Malmaison, France, 30 Nov.-2 Dec. 2009.

Function $\phi$ is given by:

$$NO_x = \alpha_1 \left(\frac{Ne}{\alpha_2}\right)^{\alpha_3} \left(\alpha_4(\hat{T} - \alpha_5)\right)^{\alpha_6(1-\alpha_7 F)} \quad (4)$$

Coefficients $\alpha_i$ are calibration parameters of the semi-physical NOx model. The values of these coefficients are calculated from experimental data, for example from tests on the engine test bench, and they are valid for an engine. Generally, the data obtained from the calibration of the thermal engine are sufficient for calibration of this type of model.

Stage 3)—Calculation of the NOx Emission Setpoint

Figure 5A:
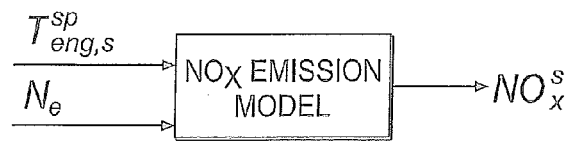
FIGS. 5a) and 5b) are flowsheets for the calculation of a torque setpoint trajectory for the thermal engine.

FIG. 5a) shows the principle for calculating the dynamic NOx emission setpoint of the thermal engine, $NO_x^{sp}$, in a transient state in a general context. The method uses a NOx emission model for determining the NOx emissions of the diesel engine.

Figure 5B:
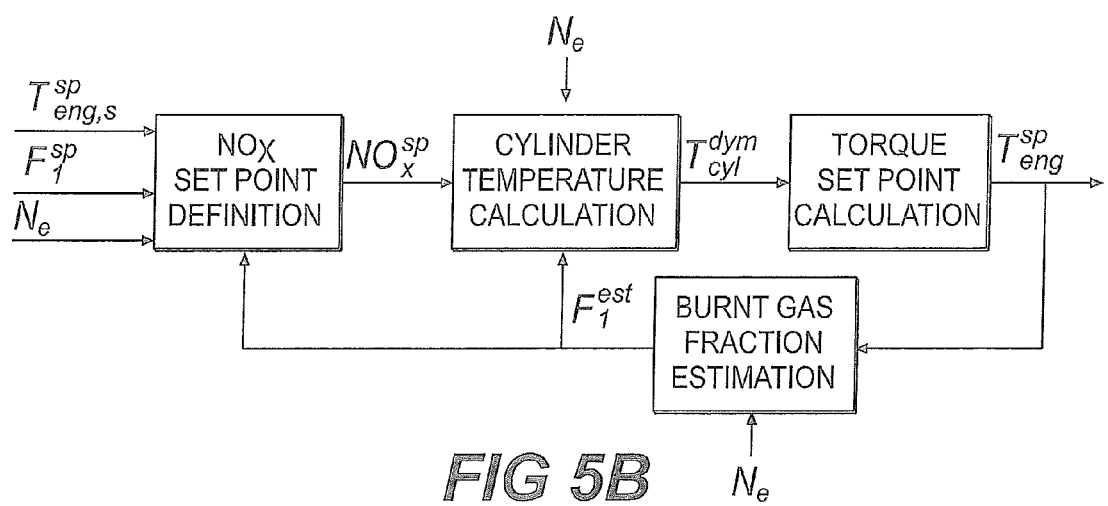

FIG. 5b) shows the principle of this calculation in the particular case of the embodiment described. The model of the drive system is based on a model representative of the NOx emissions and on a model representative of the engine air loop dynamics. Air loop is understood to be the entire intake circuit and exhaust gas recirculation circuit. The complexity level of these two models is in keeping with an integration into an energy optimization strategy that can be implemented in real time in an electronic calculator. It is a semi-empirical model (or "grey-box" model) for NOx emissions and a first-order filter including a pure delay representative of the dynamics of the burnt gas fraction at the engine intake.

These NOx emission and burnt gas dynamics models depend on the engine speed $N_e$ and on the burnt gas fraction setpoint in the intake manifold $F_1^{sp}$, upstream from a cylinder of the diesel engine, which can be given by a map depending on engine speed $N_e$ and on torque setpoint $T_{eng,s}^{sp}$.

FIG. 5b) shows the two main stages in the calculation of the torque trajectory which are determination of the NOx emissions discharged under transient operating conditions and calculation of a new trajectory of the engine torque setpoint from a reduced emission setpoint in relation to the nominal case. The NOx model is first supplied with the torque setpoint $T_{eng,s}^{sp}$ resulting from the static optimization. The model, depending on the current setpoint L and not on that of the previous calculation step), determines the NOx peak amplitude that would be generated if it was not corrected. This value serves as the basis for calculating the NOx setpoint in the calculation of the new torque trajectory. To sum up, the NOx model and the air loop dynamics model ensure filtering of the torque setpoint that pertains to the dynamics specific to the system to limit the emissions peak.

Figure 6:
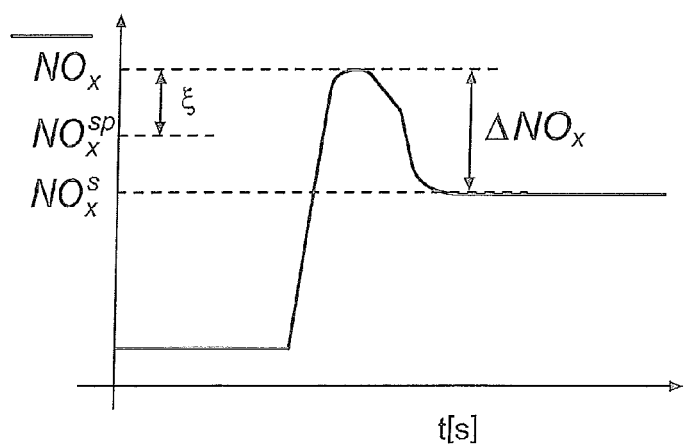
FIG. 6 illustrates the principle of the NOx setpoint calculation.

For this model, a NOx emission attenuation rate is defined by an adjustment parameter $\xi$ corresponding to the amplitude attenuation percentage of the initial NOx peak. It is thus possible to adjust the NOx reduction to the value of parameter $\xi$, for example, in FIG. 6, the transient between two steady state operating points can lead to exceeding of the steady-state emission level denoted by $NO_x^s$. The amplitude of the exceeding the steady-state emission level is denoted by $\overline{NO}_x$. It is thus possible to adapt the control according to outside conditions by adjusting parameter $\xi$. For example, in the case of an urban zone where traffic is reserved for vehicles with a low emissions level, the parameter can be adapted in order to meet the objective.

In case of significantly exceeding the steady-state emission level, an adjustment parameter $\xi$ allows defining an acceptable threshold crossing that will serve as the setpoint:

$$NO_x^{sp} = NO_x^s + \Delta NO_x \left(1 - \frac{\xi}{100}\right) \quad (5)$$

where $\Delta NO_x$ is the difference between the steady-state emissions level and the maximum transient-state peak value:

$$\Delta NO_x = \overline{NO}_x - NO_x^s \quad (6)$$

where $NO_x^s$ is the NOx emission level under steady state conditions. Parameter $\xi$ allows adjusting the intensity of the transient-state correction. If parameter $\xi$ is zero, then the NOx limitation strategy is inactive. Otherwise, an acceptable value of exceeding the steady-stated emission level is defined.

The NOx emission model, for example the model of Equation (4), is used for calculation of:
  i. The static value of the steady operating point $NO_x^s$,
  ii. The instantaneous value of the emissions generated by the nominal torque transient $NO_x(t)$, which allows determination of the dynamic NOx emission setpoint $NO_x^{sp}$, and
  iii. The instantaneous value of the emissions generated by the torque transient obtained from the limitation strategy $NO_x^{dyn}(t)$. This value is not useful for the practice of the invention, but it provides knowledge of the value of the NOx emissions produced during the transient state.

i. Calculation of the Static Value of the Steady Operating Point $NO_x^s$

Figure 7:
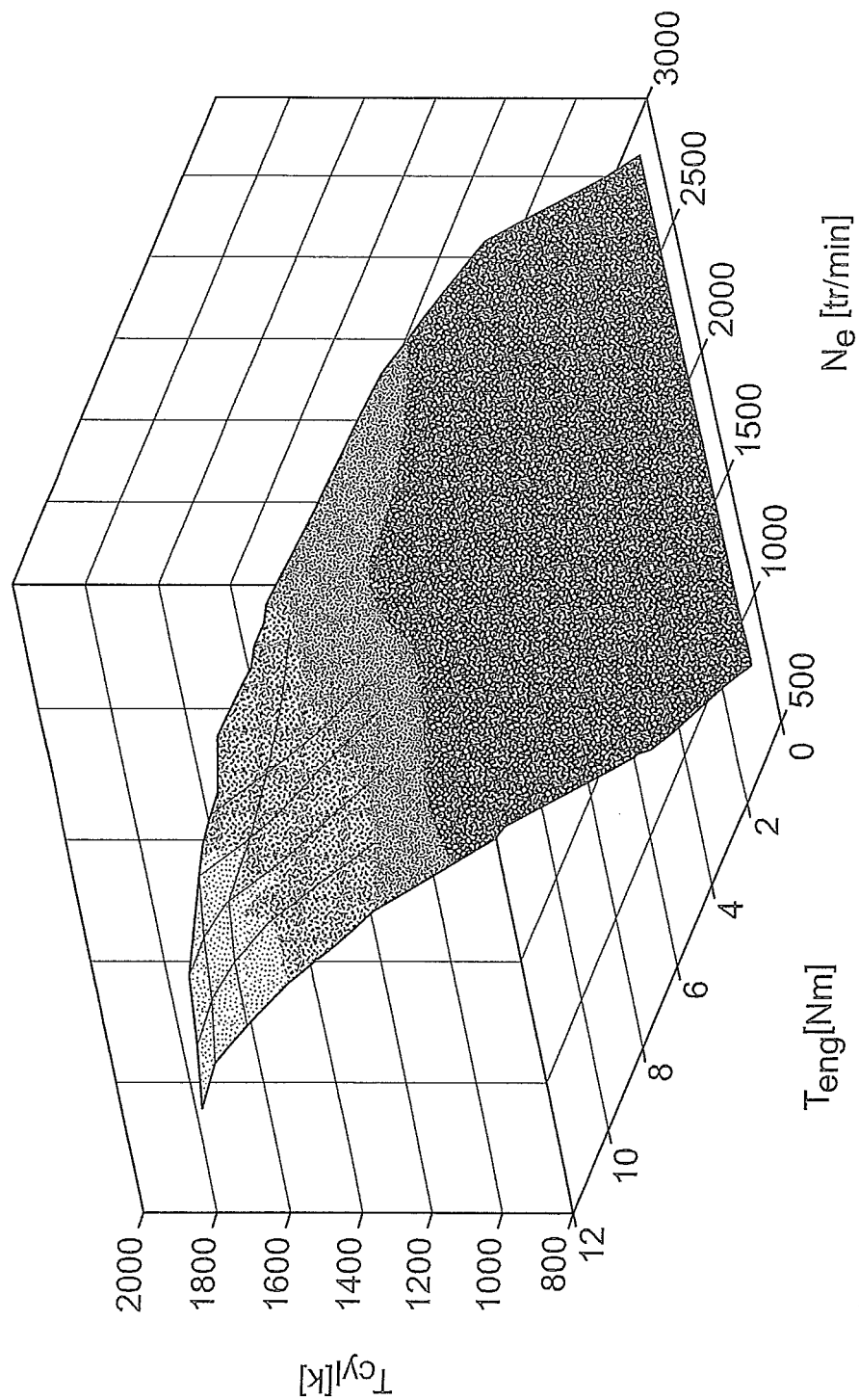
FIG. 7 illustrates the maximum temperature map of the cylinder.

The static value of the NOx emissions on the steady-state operating point $NO_x^s$ is given by:

$$NO_x^s = \phi(N_e, \hat{T}_{cyl}^{sp}, F_1^{sp}) \quad (7)$$

wherein $\hat{T}_{cyl}^{sp}$ the maximum temperature in the cylinder calculated from a map (FIG. 7) depending on engine speed $N_e$ and on the torque value on the steady-state operating point:

$$\hat{T}_{cyl}^{sp} = \psi(N_e, T_{eng,s}^{sp}) \quad (8)$$

and wherein $F_1^{sp}$ is the burnt gas fraction setpoint in the intake manifold on the steady-state operating point. It is given by a map depending on the engine speed and on the torque setpoint:

$$F_1^{sp} = f(N_e, T_{eng,s}^{sp}) \quad (9)$$

By combining Equations (7) to (9), the value $NO_x^s$ of the NOx emissions on the steady-state operating point as a function of the static torque setpoint of the diesel engine $T_{eng,s}^{sp}$ and of the diesel engine speed $N_e$ is obtained.

ii. Calculation of the Instantaneous Value of the Emissions Generated by the Nominal Torque Transient $NO_x(t)$ The instantaneous value of the emissions generated by the nominal torque transient $NO_x(t)$ is given by:

$$NO_x(t) = \phi(N_e, \hat{T}_{cyl}^{sp}, F_1^{est}(t)) \quad (10)$$

where $\hat{T}_{cyl}^{sp}$ is the maximum temperature in the cylinder (same value as for the calculation of $NO_x^s$, Equation (8)) and $F_1^{est}(t)$ is the estimated burnt gas fraction in the intake manifold. It involves the burnt gas dynamics at the intake. The gas transport dynamics model which is used is a first-order filter associated with a pure delay such as:

$$\tau(t)\frac{dF_1^{est}(t)}{dt} + F_1^{est}(t) = F_1^{sp}(t - t_r(t)) \quad (11)$$

where the filter time constant $\tau$ and the pure delay $t_r$ are parametrized as a function of the engine speed:

$$t_r(t) = \begin{cases} \frac{k_r}{N_e(t)} & \text{if } T_{eng}(t) > 0 \\ 0 & \text{otherwise} \end{cases} \quad (12)$$

and $$\tau(t) = \frac{k_\tau}{N_e(t)} \quad (13)$$

Coefficients $k_r$ and $k_\tau$ allow the burnt gas dynamics to be adjusted and are parameters for adjusting the transient emissions limitation strategy. They can be determined experimentally, for example during tests on an engine test bench. The instantaneous value of the emissions generated by the nominal torque transient $NO_x(t)$ is involved in the calculation of the amplitude of the NOx peak in relation to the steady-state point $\Delta NO_x$ described by Equation (4). The value of $\overline{NO_x}$ is calculated from the maximum amplitude of the transient emission peak and it is fixed as long as error $\epsilon NO_x$ is above a set threshold $\beta$. The quantity $\epsilon NO_x$ represents the error between the emissions generated by the nominal torque transient $NO_x(t)$ and the value of the steady point $NO_x^s$. Once the system is in steady state, it is necessary to reinitialize $\overline{NO_x}$ to the static value $NO_x^s$. This condition guarantees the independence of two consecutive transients. Finally, the maximum value of the NOx peak is written as follows:

$$\overline{NO_x} = \begin{cases} \max\{NO_x(t)\} & \text{if } \epsilon NO_x > \beta \\ NO_x^s & \text{otherwise} \end{cases} \quad (14)$$

with $$\epsilon NO_x = NO_x(t) - NO_x^s \quad (15)$$

By integrating the value of $\overline{NO_x}$ and the value $NO_x^s$ of the NOx emissions on the steady operating point determined in the previous stage into Equation (6), $\Delta NO_x$ is calculated and then the dynamic NOx emission setpoint $NO_x^{sp}$ is determined by applying Equation (5).

iii. Calculation of the Instantaneous Value of the Emissions Generated by the Torque Transient Obtained from the Limitation Strategy $NO_x^{dyn}(t)$ The instantaneous value of the emissions generated by the torque transient obtained from the limitation strategy $NO_x^{dyn}(t)$ is given by:

$$NO_x^{dyn}(t) = \phi(N_e, \hat{T}_{cyl}^{dyn}, F_1^{est}(t)) \quad (16)$$

This quantity is not used in the method. However, it provides information on the value of the emissions produced under transient conditions. It is in principle always below the estimated value of the emissions generated by the nominal torque transient. In Equation (16), $F_1^{est}$ is the estimated intake composition (same value as for the calculation of $NO_x(t)$, Equation (11)) and $\hat{T}_{cyl}^{dyn}$ is the maximum temperature in the cylinder calculated from the corrected torque setpoint $T_{eng}^{sp}$:

$$\hat{T}_{cyl}^{dyn} = \psi(N_e, T_{eng}^{sp}) \quad (17)$$

Stage 4)—Determination of the Diesel Engine Dynamic Torque Setpoint

Once the setpoint $NO_x^{sp}$ is calculated, the NOx emission model is inverted to allow calculation of a new dynamic torque setpoint $T_{eng}^{sp}$. The NOx has two purposes in the strategy. First of all, it allows calculation of the response of the system to a torque setpoint resulting from the static optimization strategy and determining therefrom a NOx setpoint. Then, it is inverted and allows calculation of the torque trajectory meeting this setpoint.

In the embodiment described, the previous equations, notably (6) and (8), can be inverted. The corrected torque trajectory is obtained by inverting the maximum cylinder temperature model described by Equation (8):

$$T_{eng}^{sp} = \psi^{-1}(N_e, \hat{T}_{cyl}^{dyn}) \quad (18)$$

Temperature $\hat{T}_{cyl}^{dyn}$ corresponds to the maximum temperature trajectory in the combustion chamber such that the emissions meet setpoint $NO_x^{sp}$. Temperature $\hat{T}_{cyl}^{dyn}$ is calculated by inverting the emission model given by Equation (5) and from setpoint $NO_x^{sp}$ and the estimation of the gas composition at the intake:

$$\hat{T}_{cyl}^{dyn} = \phi^{-1}(N_e, NO_x^{sp}, F_1^{est}) \quad (19)$$

Function $\phi^{-1}$ is written as follows:

$$\hat{T}_{cyl}^{dyn} = \alpha_5 + \frac{1}{\alpha_4}\left(NO_x^{sp}\frac{1}{\alpha_1}\left(\frac{\alpha_2}{N_e}\right)^{\alpha_3}\right)^{\frac{1}{\alpha_6(1-\alpha_7 F_1^{est})}} \quad (20)$$

By combining Equations (18) and (20), the dynamic torque setpoint of the diesel engine $T_{eng}^{sp}$ is obtained with this setpoint depending on engine speed $N_e$, the estimated burnt gas fraction in the intake manifold $F_1^{est}$ and the dynamic NOx emission setpoint $NO_x^{sp}$.

Stage 5)—Determination of the Dynamic Torque Setpoint of the Electric Machine

The method according to the invention provides thermal engine torque compensation under transient conditions by at least one electric machine so that the wheel torque request is met. It is therefore necessary to determine the dynamic torque setpoint of the electric machine. This torque setpoint can be obtained by inverting Equation (1):

$$T_{mot}^{sp} = T_{pwt}^{sp} - T_{eng}^{sp} \quad (21)$$

Stage 6)—Application of the Dynamic Torque Setpoints

The invention allows determination of the torque setpoints of the drive of the hybrid system. By applying these setpoints to the thermal engine and to the electric machine, an emissions decrease is obtained and the fuel consumption can also be limited.

Segmentation of the static and transient optimization layers allows uncoupling into two sampling periods which are high frequency for transient optimization and low frequency for the static part. The dynamic optimization period is suited to the physical phenomena involved in the engine which in the present case is the production of emissions.

The parameters of the method and their orders of magnitude are summed up in Table 2.

TABLE 2

List of the adjustment parameters of the strategy

| Symbol | Description | Order of magnitude |
|---|---|---|
| $\zeta$ | NOx peak reduction factor | [0; 100] |
| $\alpha_i$ | 7 calibration coefficients of the NOx emissions model | Depends on the engine considered |
| $k_r$ | Pure delay adjustment coefficient | [200; 1000] |
| $k_\tau$ | Adjustment coefficient of the first-order filter time constant | [500; 2000] |
| $\beta$ | NOx setpoint initialization threshold | [1; 10] |
| $F_1^{sp} = f(N_e, T)$ | Map of the burnt gas fraction setpoint at the intake | Constructed from engine calibration data |
| $\hat{T}_{cyl} = \psi(N_e, T)$ | Map of the maximum cylinder temperature | Constructed from calibration data |

Variants

The invention has been described above within the context of a preferred embodiment. However, the invention can also relate to different variants that can be combined.

Stage 1)—Acquisition of a Torque Setpoint

The static torque setpoint can directly result from a request from the car driver and not from an energy supervisor of static or quasi-static type, notably in an embodiment where the hybrid drive system is provided with no energy supervisor.

Stage 2)—Construction of the NOx Emission Model

If the thermal engine is not equipped with an exhaust gas recirculation circuit, an invertible NOx emission model depending only on the engine speed and the cylinder temperature is defined as $NO_x(t)=\phi(N_e,\hat{T}_{cyl},0)=\phi'(N_e,\hat{T}_{cyl})$. The cylinder temperature which is a function of the thermal engine torque setpoint ($\hat{T}_{cyl}^{dyn}=\psi(N_e,T_{eng}^{sp})$) remains valid. As in the preferred embodiment, the NOx emission model is a semi-empirical model obtained by correlation with experimental tests on engine test benches. For example, Equation (4) can be rewritten by assuming that the burnt gas fraction in the intake manifold is zero. Thus:

$$NO_x = \alpha_1\left(\frac{Ne}{\alpha_2}\right)^{\alpha_3}\left(\alpha_4(\hat{T}_{cyl}-\alpha_5)\right)^{\alpha_6}$$

Stage 3)—Calculation of the NOx Emission Setpoint

Instead of using adjustment parameter $\xi$ to determine a NOx emission attenuation rate, it is possible to define a NOx emission threshold S that should not be exceeded. The threshold S can be fixed to whatever the static state is to be reached, or it can depend on the target steady operating point. The equation ($NO_x^{sp} \leq S$) has to be satisfied. This equation is introduced in stage ii) in place of Equation (3) of the embodiment described. This threshold can be set according to the legislation in force concerning emissions.

Stage 4)—Determination of the Diesel Engine Dynamic Torque Setpoint

When the diesel engine is not equipped with an exhaust gas recirculation circuit, the NOx emission model is inverted: $NO_x(t)=\phi'(N_e,\hat{T}_{cyl})$ to determine the diesel engine dynamic torque setpoint: $\hat{T}_{cyl}^{dyn}=\phi'^{-1}(N_e,NO_x^{sp})$ and then $T_{eng}^{sp}=\psi^{-1}(N_e,\hat{T}_{cyl}^{dyn})$.

Stage 5)—Determination of the Dynamic Torque Setpoint of the Electric Machine

Other types of compensation accounting for the capacities (operating range) of the electric machine can be used in the control method according to the invention. For example, if the dynamic torque setpoint of the electric machine $T_{mot}^{sp}$ exceeds the maximum torque allowable by the electric machine, the torque setpoint of the electric machine is set at the maximum torque, then the dynamic torque setpoint of the thermal engine $T_{eng}^{sp}$ is recalculated by adapting it to the dynamic torque setpoint change of the electric machine. The best use of the components of the hybrid drive system is thus made with a non-optimal emissions reduction.

Application Example

The results presented in this part are obtained from simulations of a diesel hybrid vehicle with a parallel architecture. The diesel engine is equipped with a burnt gas recirculation system. The thermal engine model is a physical model that can predict emissions and, in particular, NOx emissions. Such a model is for example described in the following document:

R. Lebas, G. Mauvio, F. Le Berr & A. Albrecht, "A Phenomenological Approach to Model Diesel Engine Combustion and In-Cylinder Pollutant Emissions Adapted to Control Strategy, Proceedings of the IFAC workshop on engine and powertrain control, simulation and modeling", Rueil-Malmaison, France, 30 Nov.-2 Dec. 2009.

This model has been calibrated from tests carried out on a Euro 6 diesel engine. The strategy of emissions limitation under transient conditions has been coupled with a static energy supervisor whose principle is based on optimal control. It is presented in the aforementioned document:

O. Grondin, L. Thibault, Ph. Moulin, A. Chasse & A. Sciarretta, "Energy Management Strategy for Diesel Hybrid Electric Vehicle", Proceedings of the 7$^{th}$ IEEE Vehicle Power and Propulsion Conference, Chicago, USA, 6-9 Sep. 2011.

Figure 8A:
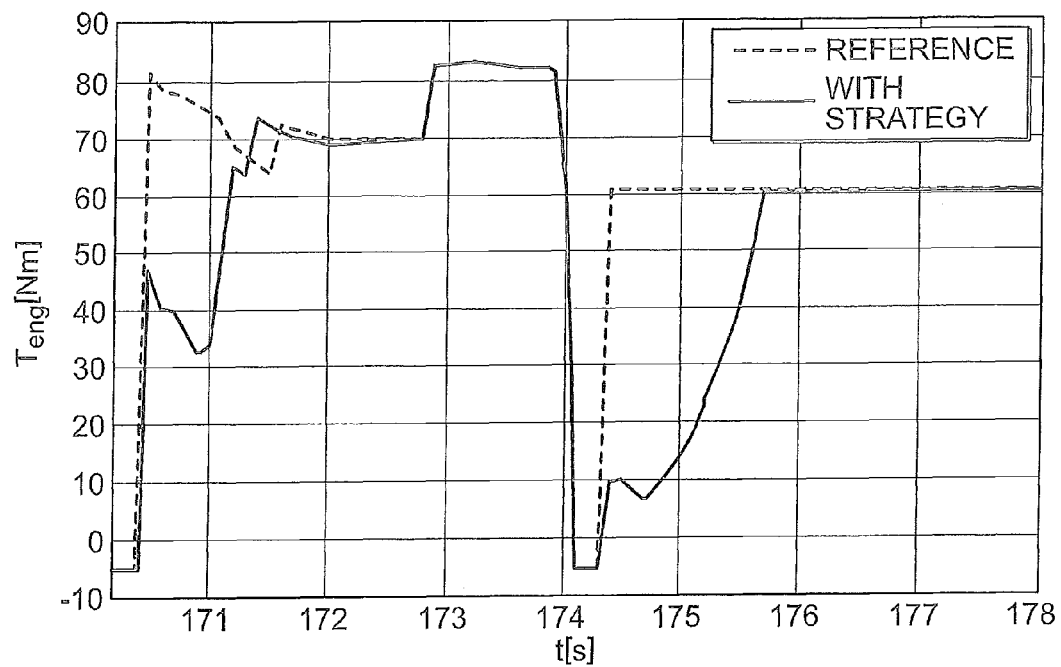
FIGS. 8a) to 8f) show simulation results for the method of controlling a hybrid drive system according to the invention, in terms of thermal engine torque (8a)), electric motor torque (8b)), burnt gas fraction (8c)), cylinder temperature (8d)), and NOx emissions (8e)) and (8f))
Figure 8B:
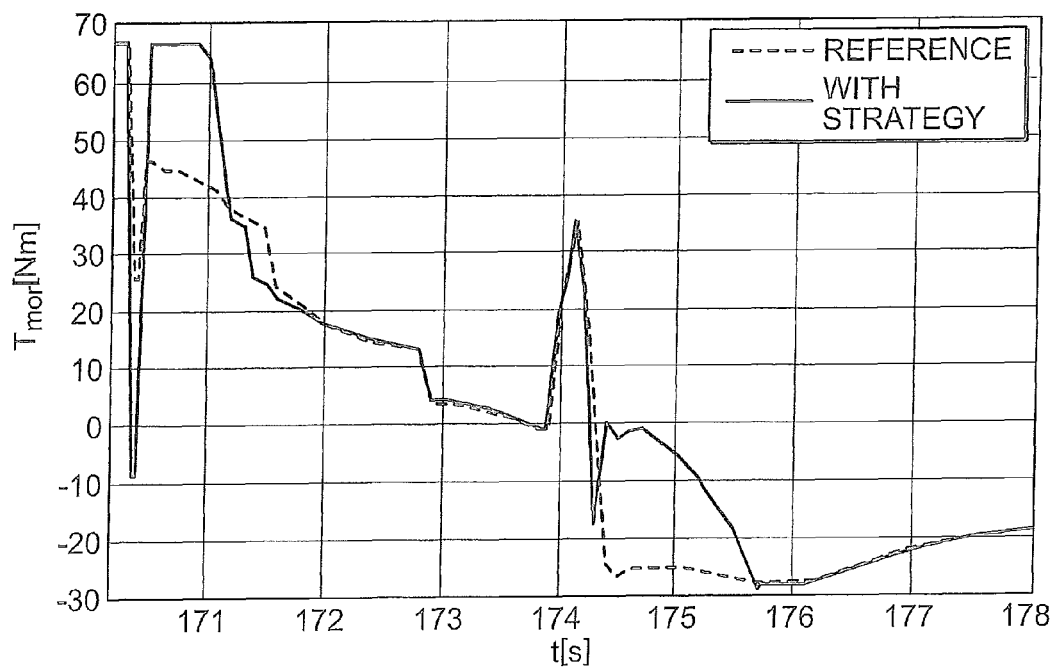
Figure 8C:
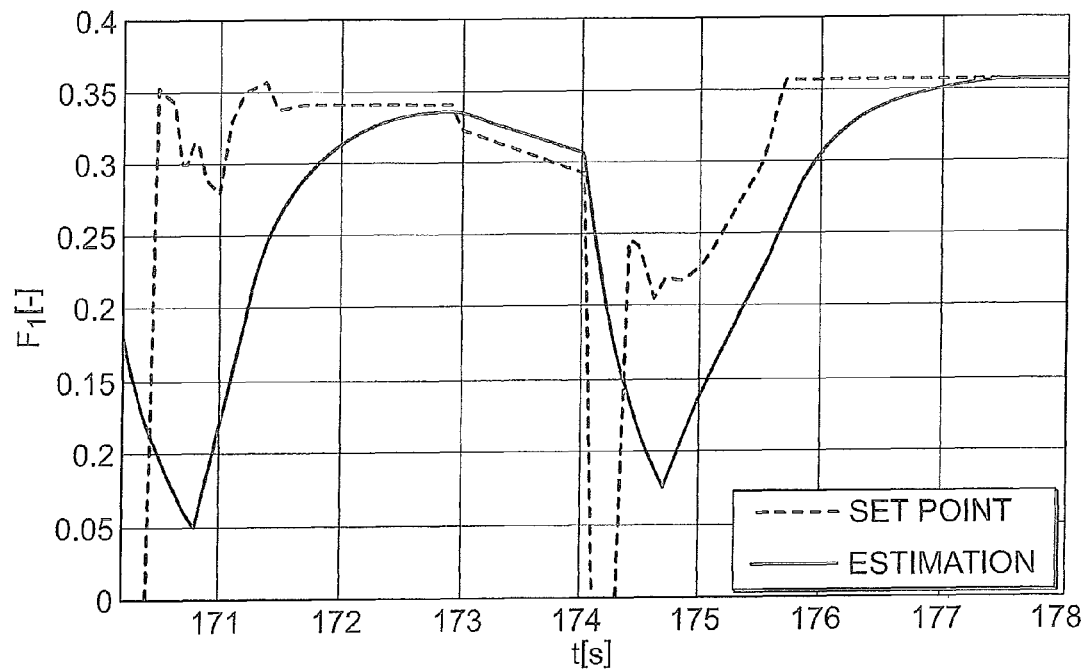
Figure 8D:
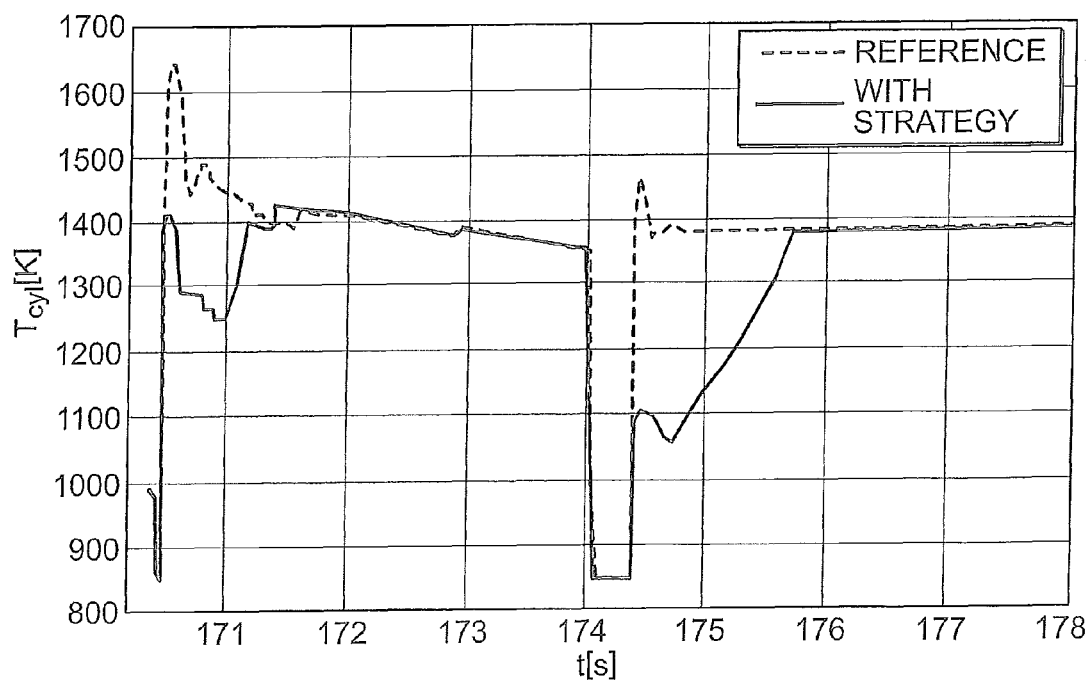
Figure 8E:
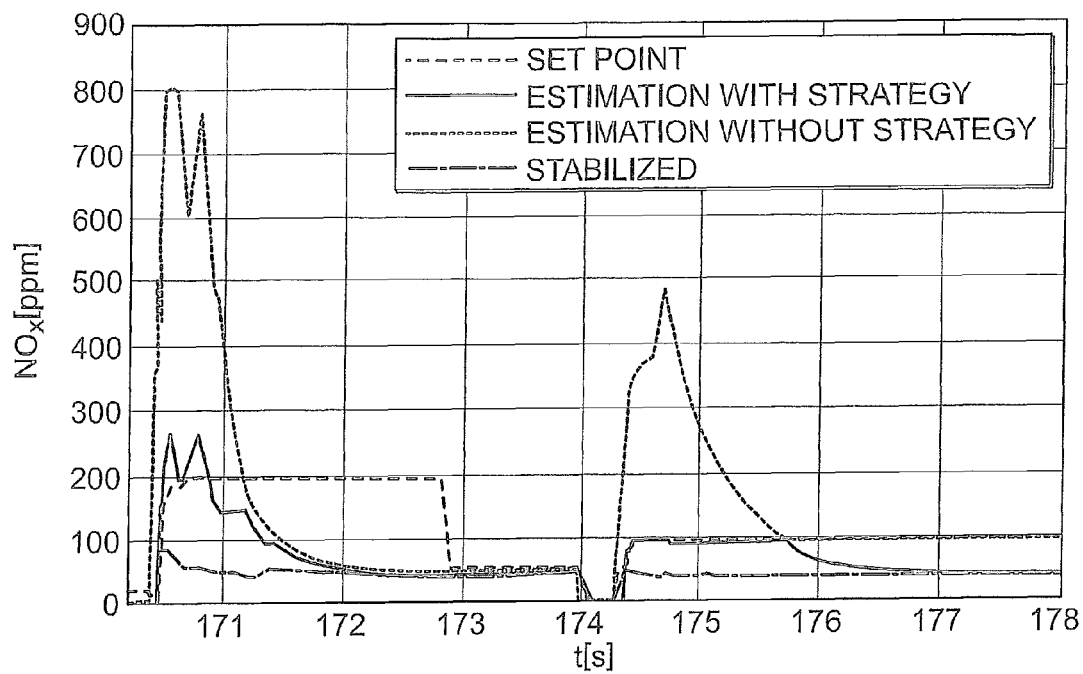
Figure 8F:
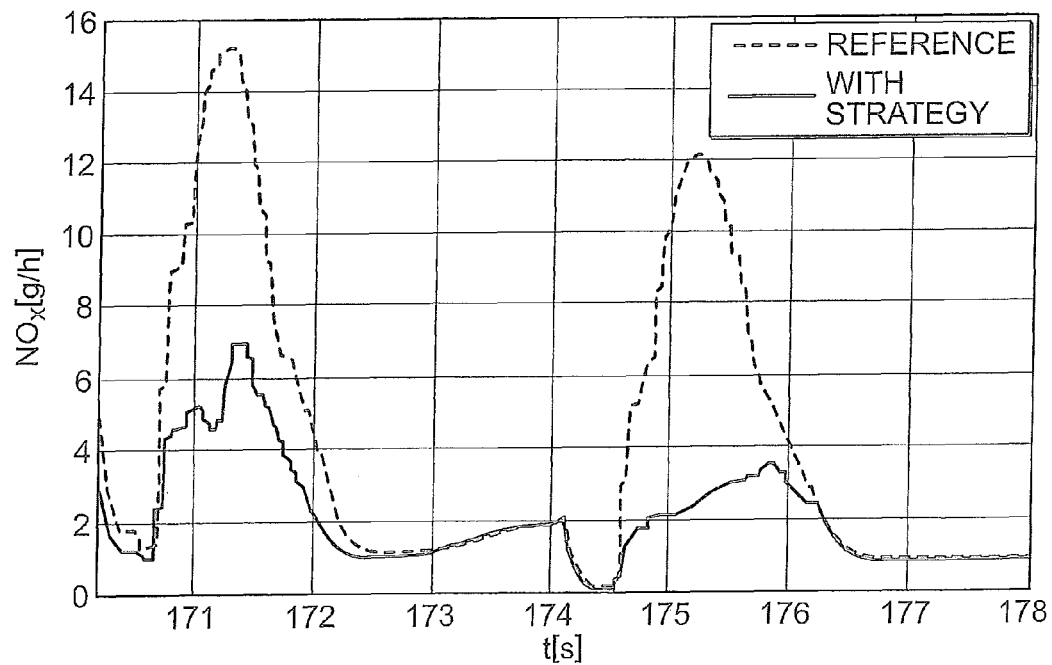

FIGS. 8a) to 8f) show a portion of an FTP driving cycle where the control method is active. It is first noted that the steady operating points are not modified. On the other hand, in transient state, the torque of the thermal engine is limited (FIG. 8a)). The limitation operates in phases where there are great differences between the setpoint and the estimation of the burnt gas fraction at the intake (FIG. 8c)). In this case, the internal NOx model anticipates a significant exceeding of the expected level in steady state (FIG. 8e)). The torque distribution changes and the electric machine allowed to limit the thermal engine dynamics (FIG. 8b)). The emission peaks that appear during these phases (FIG. 8f)) are greatly reduced. It is observed that the emissions peak reduction results from the temperature limitation in the cylinder (FIG. 8d)). Indeed, this quantity is extremely important in the kinetic NOx production mechanisms. These results show that account for in an energy supervisor physical quantities that govern the production of NOx emissions leads to good results.

Figure 9:
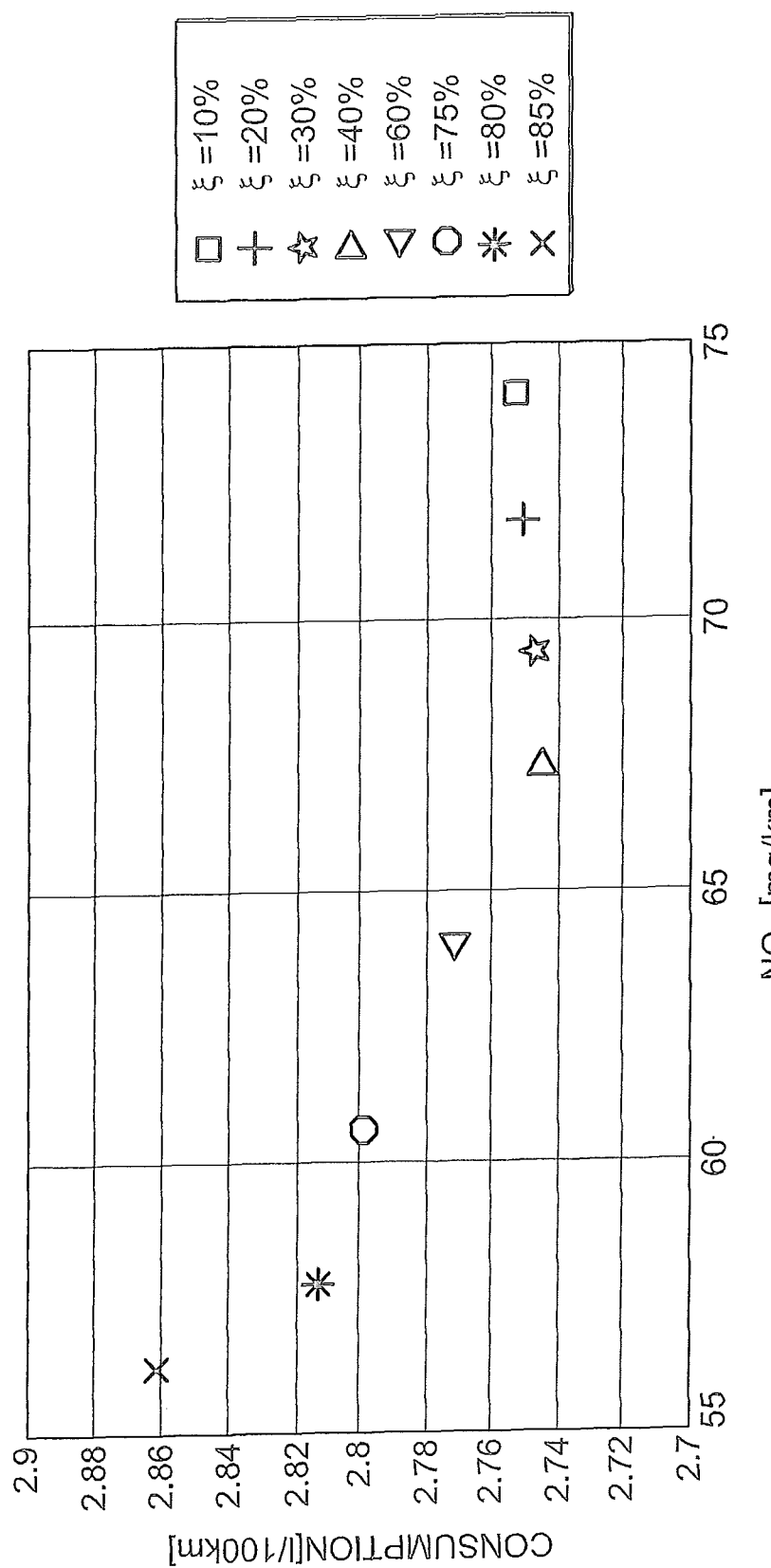
FIG. 9 shows the evolution of the fuel consumption as a function of the NOx emissions for various reduction factor values.
Figure 10:
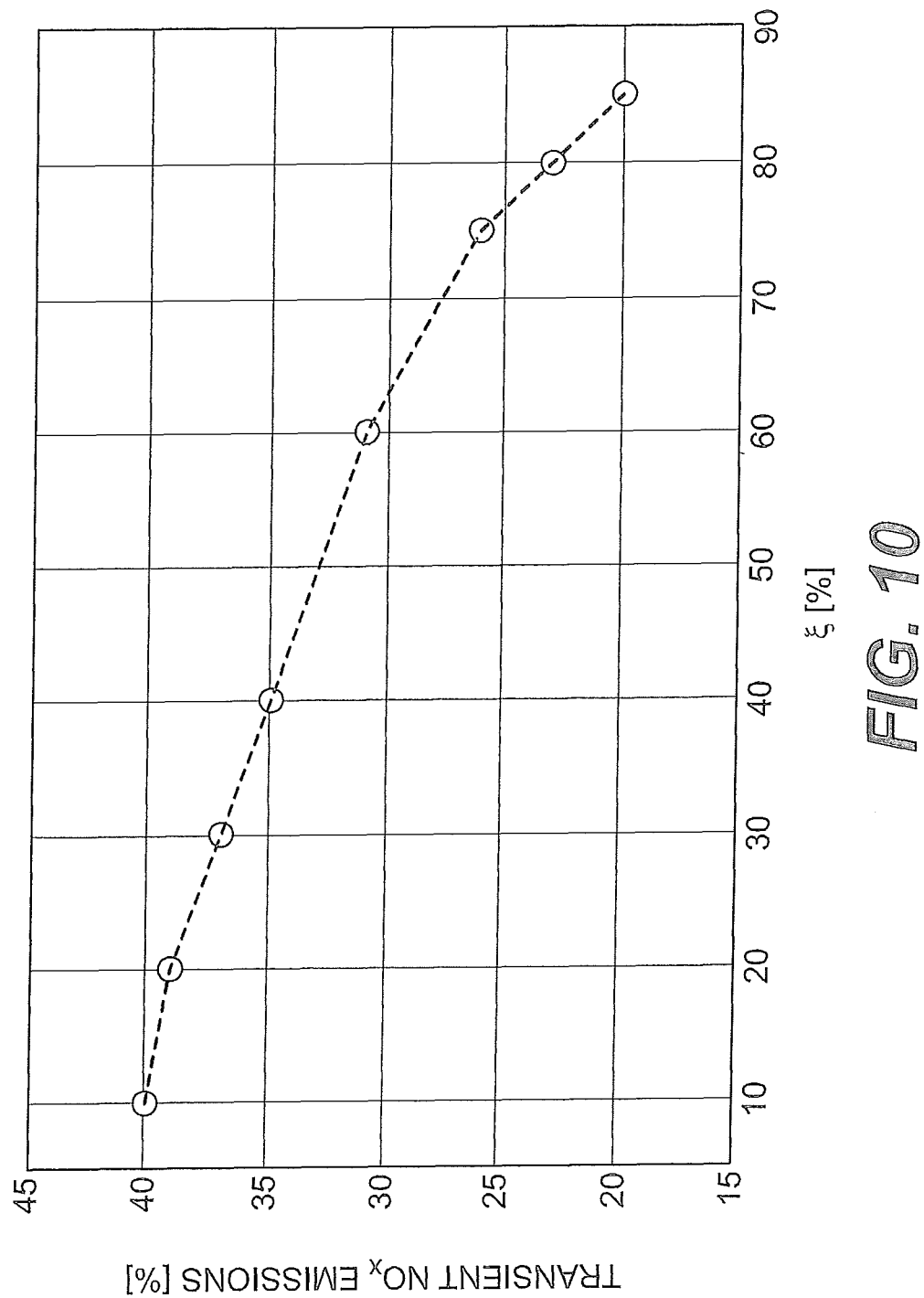
FIG. 10 illustrates the part of the transient NOx emissions in an FTP cycle as a function of the reduction factor.

FIG. 9 shows the hybrid vehicle consumption and the NOx emissions obtained in an FTP driving cycle and for an adjustment parameter ξ value scan for these simulations. The results show that it is possible to find values of this parameter which decreases the value of the NOx emissions without modifying the consumption of the vehicle. This is the case when ξ ranges between 10 and 40%. For higher values, the emissions continue to decrease but the consumption can increase substantially. In this case, parameter ξ allows adjustment of the compromise between the NOx emissions and the fuel consumption. In any case, the part of the transient NOx emissions in an FTP cycle decreases as parameter ξ increases as shown in FIG. 10.

Furthermore, the method according to the invention has the following advantages:

is possible to modify online the emissions level during transient phases, to use the physical phenomena models that are a semi-physical model (of correlation type) for NOx emissions prediction and an air loop dynamics model limiting the number of adjustment parameters, and the invention is suitable for a hybrid vehicle equipped with a compression ignition engine but it could also be suitable for a spark-ignition engine.

The invention claimed is:

1. A computer-implemented method of controlling a hybrid drive system including at least one electric machine and at least one diesel engine, wherein a static torque setpoint of the diesel engine is acquired, comprising:

constructing a NOx emission model allowing estimation of the emissions of the diesel engine as a function of a torque of the diesel engine;

calculating a dynamic NOx emission setpoint from the NOx emission model and from the static torque setpoint of the diesel engine, a NOx reduction factor parameter ξ being set, and the NOx emission setpoint $NO_x^{sp}$ being calculated as a function of the NOx reduction factor ξ according to the equations:

$$NO_x^{sp} = NO_x^s + \Delta NO_x\left(1 - \frac{\xi}{100}\right)$$

wherein $NO_x^s$ is a level of the NOx emissions under static conditions and $\Delta NO_x$ is the NOx peak amplitude with respect to static conditions and $$\Delta NO_x = \overline{NO}_x - NO_x^s$$

wherein $\overline{NO}_x$ is the maximum dynamic peak value and $NO_x^s$ is the NOx emission level under static conditions;

determining a dynamic torque setpoint of the diesel engine from the NOx emission setpoint;

determining a dynamic torque setpoint of the electric machine as a function of the dynamic torque setpoint of the diesel engine; and applying the dynamic torque setpoints to the drive system.

2. A method as claimed in claim 1, wherein:
the nitrogen oxide emission model depends on speed of the diesel engine and on a maximum temperature in an engine cylinder.

3. A method as claimed in claim 1, wherein:
the diesel engine is equipped with an exhaust gas recirculation system providing burnt gas to an intake manifold, upstream from a cylinder of the diesel engine and NOx emission model depends on a burnt gas fraction in an intake manifold of the diesel engine.

4. A method as claimed in claim 2, wherein:
the diesel engine is equipped with an exhaust gas recirculation system providing burnt gas to an intake manifold, upstream from a cylinder of the diesel engine and NOx emission model depends on a burnt gas fraction in an intake manifold of the diesel engine.

5. A method as claimed in claim 1, wherein:
the NOx emissions are modelled by the formula:

$$NO_x = \alpha_1\left(\frac{N_e}{\alpha_2}\right)^{\alpha_3}\left(\alpha_4(\hat{T}_{cyl} - \alpha_5)\right)^{\alpha_6(1-\alpha_7 F_1)}$$

with:
$\alpha_1$ to $\alpha_7$ being calibration coefficients of the NOx emission model;
$N_e$ being diesel engine speed;
$\hat{T}_{cyl}$ being a maximum temperature in an engine cylinder;
$F_1$ being a burnt gas fraction in the intake manifold of a diesel engine equipped with an exhaust gas recirculation circuit and with $F_1$ being zero otherwise; and
$NO_x$ is a NOx emissions level.

6. A method as claimed in claim 2, wherein:
the NOx emissions are modelled by the formula:

$$NO_x = \alpha_1\left(\frac{N_e}{\alpha_2}\right)^{\alpha_3}\left(\alpha_4(\hat{T}_{cyl} - \alpha_5)\right)^{\alpha_6(1-\alpha_7 F_1)}$$

with:
$\alpha_1$ to $\alpha_7$ being calibration coefficients of the NOx emission model;
$N_e$ being diesel engine speed;
$\hat{T}_{cyl}$ being a maximum temperature in an engine cylinder;
$F_1$ being a burnt gas fraction in the intake manifold of a diesel engine equipped with an exhaust gas recirculation circuit and with $F_1$ being zero otherwise; and
$NO_x$ is a NOx emissions level.

7. A method as claimed in claim 3, wherein:
the NOx emissions are modelled by the formula:

$$NO_x = \alpha_1\left(\frac{N_e}{\alpha_2}\right)^{\alpha_3}\left(\alpha_4(\hat{T}_{cyl} - \alpha_5)\right)^{\alpha_6(1-\alpha_7 F_1)}$$

with:

$\alpha_1$ to $\alpha_7$ being calibration coefficients of the NOx emission model;

$N_e$ being diesel engine speed;

$\hat{T}_{cyl}$ being a maximum temperature in an engine cylinder;

$F_1$ being a burnt gas fraction in the intake manifold of a diesel engine equipped with an exhaust gas recirculation circuit and with $F_1$ being zero otherwise; and $NO_x$ is a NOx emissions level.

8. A method as claimed in claim 1, wherein:

a NOx emission threshold is defined for the diesel engine and the NOx emission setpoint is calculated as a function of the threshold.

9. A method as claimed in claim 1, wherein:

determination of the dynamic torque setpoint of the diesel engine is obtained by inverting the NOx emission model.

10. A method as claimed in claim 2, wherein:

determination of the dynamic torque setpoint of the diesel engine is obtained by inverting the NOx emission model.

11. A method as claimed in claim 3, wherein:

determination of the dynamic torque setpoint of the diesel engine is obtained by inverting the NOx emission model.

12. A method as claimed in claim 5, wherein:

determination of the dynamic torque setpoint of the diesel engine is obtained by inverting the NOx emission model.

13. A method as claimed in claim 8, wherein:

determination of the dynamic torque setpoint of the diesel engine is obtained by inverting the NOx emission model.

14. A method as claimed in claim 1, wherein:

the static torque setpoint of the diesel engine is obtained from a drive system torque setpoint by an energy supervisor.

\* \* \* \* \*